United States Patent
Madduri et al.

(10) Patent No.: US 12,529,359 B2
(45) Date of Patent: Jan. 20, 2026

(54) HANDLING A POWER CABLE OF A WIND TURBINE

(71) Applicant: Siemens Gamesa Renewable Energy A/S, Brande (DK)

(72) Inventors: Srinivas Madduri, Bangalore (IN); Darshan S N, Bangalore (IN); Roushan Kumar Singh, Bengaluru (IN); Madhup Tiwari, Bangalore (IN)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/702,231

(22) PCT Filed: Oct. 13, 2022

(86) PCT No.: PCT/EP2022/078521
§ 371 (c)(1),
(2) Date: Apr. 17, 2024

(87) PCT Pub. No.: WO2023/072609
PCT Pub. Date: May 4, 2023

(65) Prior Publication Data
US 2025/0237197 A1    Jul. 24, 2025

(30) Foreign Application Priority Data
Oct. 28, 2021 (EP) .................................. 21205335

(51) Int. Cl.
*F03D 80/80* (2016.01)
*F03D 13/10* (2016.01)
*F03D 13/40* (2016.01)

(52) U.S. Cl.
CPC ........... *F03D 80/85* (2016.05); *F03D 13/122* (2023.08); *F03D 13/135* (2023.08); *F03D 13/40* (2016.05)

(58) Field of Classification Search
CPC ........ F03D 80/85; F03D 13/40; F03D 13/135; F03D 13/122
See application file for complete search history.

(56) References Cited

U.S. PATENT DOCUMENTS

| | | | | |
|---|---|---|---|---|
| 5,586,417 | A | * 12/1996 | Henderson | ............ E04H 12/085 52/741.15 |
| 2012/0133144 | A1 | * 5/2012 | Barton | ................... H02G 11/00 290/55 |

(Continued)

OTHER PUBLICATIONS

PCT International Search Report and Written Option of International Searching Authority mailed Jan. 16, 2023, corresponding to PCT International Application No. PCT/EP2022/078521 filed Oct. 13, 2022.

(Continued)

*Primary Examiner* — Sean Gugger
(74) *Attorney, Agent, or Firm* — Schmeiser, Olsen & Watts, LLP

(57) ABSTRACT

An arrangement for handling a power cable of an offshore, wind turbine for transportation and/or connecting to a switch gear and/or reconnecting, the arrangement including: a cable support system adapted to support a portion of the power cable; a guiding system being fixedly connectable or connected to a wind turbine tower and being adapted to guide the cable support system along a linear, vertical, track is provided.

17 Claims, 9 Drawing Sheets

(56) References Cited

U.S. PATENT DOCUMENTS

Figure 1:
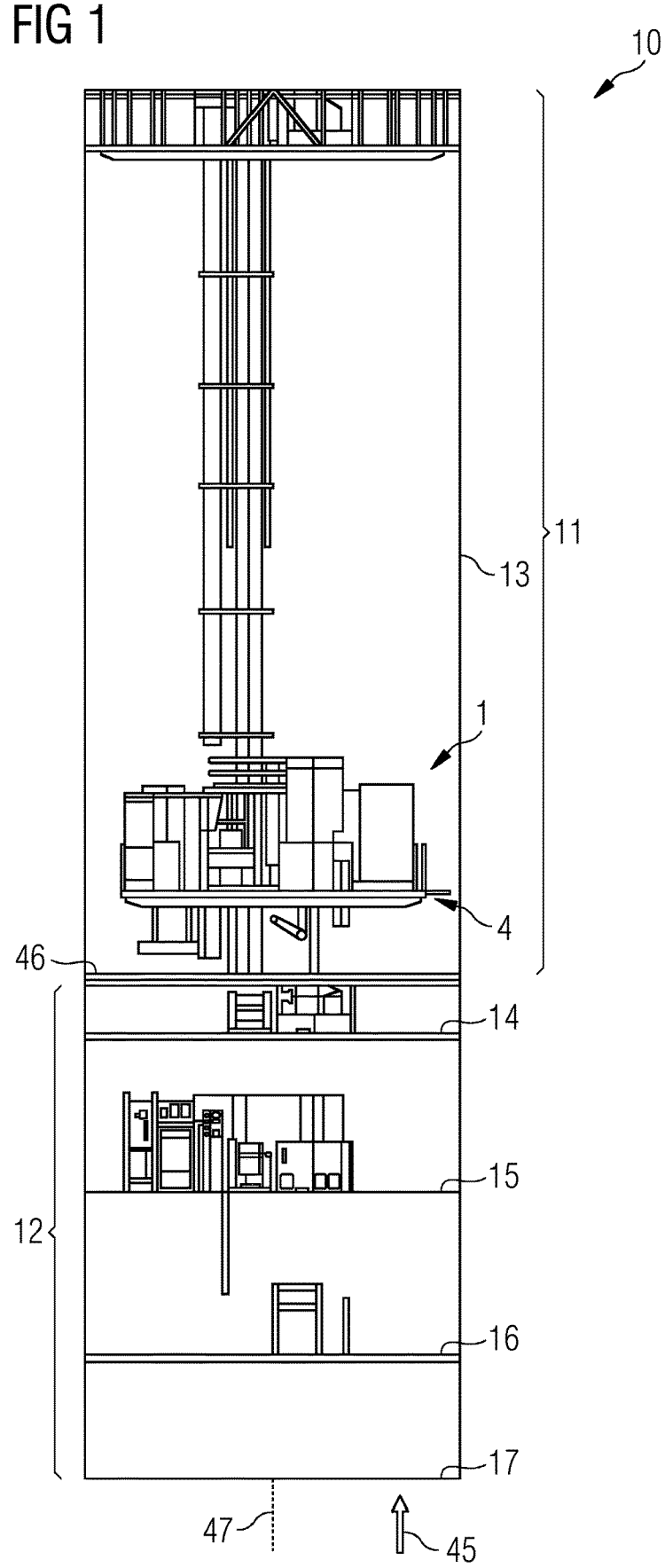

| | | | | |
|---|---|---|---|---|
| 2013/0183133 A1* | 7/2013 | Munk-Hansen | ........ | F03D 80/80 248/62 |
| 2015/0222106 A1* | 8/2015 | Caspari | .................. | F03D 80/80 174/651 |
| 2022/0195996 A1* | 6/2022 | Blaabjerg | ................ | F03D 13/40 |
| 2022/0403828 A1* | 12/2022 | Nielsen | .................. | F03D 13/10 |

OTHER PUBLICATIONS

European Search Report mailed Apr. 12, 2022 corresponding to European Application No. 21205335.9, filed Oct. 28, 2021.

* cited by examiner

HANDLING A POWER CABLE OF A WIND TURBINE

CROSS-REFERENCE TO RELATED APPLICATIONS

This application claims priority to PCT Application No. PCT/EP2022/078521, having a filing date of Oct. 13, 2022, which claims priority to EP Application Serial No. 21205335.9, having a filing date of Oct. 28, 2021, the entire contents both of which are hereby incorporated by reference.

FIELD OF TECHNOLOGY

The following relates to an arrangement and to a method of handling a power cable portion of a wind turbine, in particular for transportation and/or connecting to a switch gear and/or reconnecting. Furthermore, the following relates to a wind turbine comprising the arrangement.

BACKGROUND

In a nacelle installed on top of a wind turbine tower, a wind turbine comprises a generator, which generates electric energy upon rotation of a rotor having attached thereon plural rotor blades. The electrical output power is conveyed in a power cable running through the wind turbine tower and supplied to a sea cable or underground cable which supplies the electric energy to a utility grid.

Conventionally, the installation of the high voltage (HV) power cable in the wind turbine tower is performed at an assembly site, such as an assembly harbour before operation site installation, for example offshore installation. In the conventional method, the power cable is pulled by a hoist arranged in the top of the wind turbine tower from a drum in the bottom of the tower.

In order to provide a sufficient cable length to connect the cable system in the later installed nacelle and in order to provide sufficient cable for reconnection scenarios during service lifetime, an overlength of the cable has to be considered in the wind turbine tower and stored during offshore transport or in general during transport to the final operation site. Conventionally, the overlength of the cable may have been coiled up in the uppermost platform of the wind turbine tower.

In some wind turbine configurations of offshore wind turbines, it may be necessary to pull a high-voltage cable extra length in the bottom of the tower at a pre-assembly site to store it for transportation of the wind turbine tower and the nacelle to a final operation side. Later, at the installation side, it may be necessary to guide the cable end safely down into the foundation and/or a transition piece at which the wind turbine tower may be mounted. Further, it may be necessary to connect the end of the extended cable to a switch gear unit which may be located within a foundation or a transition piece.

Due to the high weight of the cable (around 20 kg/m cable), the cable is difficult to handle manually. Thus, handling the cable may require a mechanism to pull and store the cable safely into the tower bottom for transportation and transport it in the same condition on the installation vessel up to the offshore intended operation site. At the offshore installation site, it may be necessary to lower the cable down into the foundation and/or transition piece and to connect it to the switch gear unit or any other connection equipment (which may eventually be connected to a sea cable which may be buried in a sea ground). It may also be desirable that variation in the cable length due to changing elevation of the switch gear platform for different wind turbines or execution projects is accounted for. Furthermore, it may be desirable to allow the exchange of the cable and the switch gear in case of any failure during wind turbine lifetime.

Thus, there may be a need for an arrangement and for a corresponding method of handling a power cable of a, in particular offshore wind turbine which method may for example be applied for preparing the wind turbine tower together with the cable for transporting to an offshore operation site. Furthermore, in embodiments the method may be applied for connecting the power cable to a switch gear or any other terminal or connection equipment, in order to electrically connect the power cable to a sea ground buried cable. Furthermore, in embodiments the method may be applied for reconnecting the power cable, for example after having disconnected the connection due to any failure or other reasons.

SUMMARY

An aspect relates to an arrangement for handling a power cable of a, in particular offshore, wind turbine, in particular for transportation and/or connecting to a switch gear and/or reconnecting, the arrangement comprising: a cable support system (e.g. configured as a half wheel) adapted to support/hold a portion of the power cable; a guiding system being fixedly connectable or connected to a wind turbine tower and being adapted to guide the cable support system along a linear, in particular vertical, track.

The power cable may for example be a high voltage power cable, capable of carrying electric power at a voltage between for example 1 kV and 100 kV, or between 10 kV and 80 kV in particular around 66 kV. The power cable may have a diameter (of conductors of the cable) between 50 mm and 200 mm, particular between 95 mm and 115 mm. Due to the relatively high diameter of the power cable, the power may be associated with the power cable. The minimum radius of curvature may for example be within the range of 300 mm and 2000 mm, in particular between 570 mm and 1150 mm corresponding to 6 times the diameter for a fixated cable and 10 times the diameter for a free hanging cable. The power cable may in particular be adapted to carry electrical power in three electrical phases or even more electrical phases.

The arrangement may completely be located or locatable within a wind turbine tower. The cable support system may comprise one or more elements to support and/or hold a portion of the power cable. The cable support system may respect a minimum bending radius of the power cable. In particular, the cable support system may be adapted to support a bent portion of the power cable, in particular having a shape of a half-circle. A plane of the half-circle of the power cable (when arranged at the support system) may have a normal which is oriented in particular in a horizontal direction and in particular approximately or substantially perpendicular to a longitudinal axis of the wind turbine tower. The cable support system may have one or more contact surfaces for contacting and/or supporting the portion of the power cable. The arrangement may further comprise one or more locking elements which may allow to lock the power cable supported by the cable support system to the cable support system. The cable support system may for example comprise a groove (or groove like portions) extending for example in a curved shape, in particular extending in a substantially circular shape for supporting the power cable when arranged within the groove. When using the arrangement, the power cable may be guided or guidable along the groove of the cable support system. The cable support system may substantially be manufactured from metallic elements, in particular comprising steel and Aluminium.

The cable support system may in particular comprise a half wheel, wherein the power cable may be supportable at a circumference or at an outer circumference of the half wheel. The cable support system may for example comprise a half of a circular annulus, wherein the half-annulus may be closed by a in particular first linear or straight element, such as a bar. Furthermore, perpendicular or traverse to the first linear bar or element of the cable support system, a further straight or linear second (metallic) element or bar may connect in particular a center of the first linear or straight element or bar with the half-annulus. Thereby, a stable cable support system may be provided which may be capable of supporting the heavy power cable.

A groove (or groove like sections) of the cable support system may be provided with one or more rollers or wheels which may allow to guide the power cable along the groove during handling the power cable.

The arrangement may for example be operated for storing the power cable entirely within the wind turbine tower, to prepare the wind turbine tower for transportation to an installation site, in particular an offshore installation site. The arrangement may also be operated for connecting an end of the power cable to a switch gear unit after the wind turbine tower has been mounted to a foundation, in particular offshore foundation. For storing the power cable entirely within the wind turbine tower, the guiding system together with the cable support system may be utilized, such that an end of the power cable does not protrude from a bottom part of the wind turbine tower.

For lowering the end of the power cable for connection to a switch gear, the guiding system together with the cable support system may be utilized wherein the cable support system may be guided at the guiding system vertically downwards. For lifting the power cable, the cable support system may be guided at the guiding system vertically upwards.

The guiding system may comprise one or more metallic elements, in particular comprising steel. The guiding system may fixedly be connected to a wind turbine tower directly or indirectly for example via a platform, as will be explained below. When the guiding system is connected to the wind turbine tower and/or to a wind turbine tower platform and the wind turbine tower is installed at the final operation site, the linear track provided by the guiding system may essentially or substantially be oriented vertically. Thereby, the guiding system may allow vertical movement of the cable support system upwards and downwards, for supporting different power cable handling actions.

According to an embodiment of the present invention, the cable support system comprises a cable contact surface for contacting/supporting a portion of the cable; at least two, in particular at least two, guiding system contact portions for contacting to the guiding system.

The cable contact surface may comprise a continuous surface or one or more surface portions which may contact the power cable for supporting the power cable. The contact surface may be configured as a groove or one or more groove portions, wherein a groove cross-sectional shape may substantially correspond to a portion of a circle. The cable contact surface may also comprise surfaces of one or more rollers or wheels which are rotatable in order to allow movement of the power cable along the cable support system for allowing the power cable to be moved along the cable support system. The power cable may be supported by the cable support system in the sense that the power cable may form substantially a half-circle being above or laid on a half wheel.

The cable support system may further comprise one or more rollers at an outer periphery such as to engage the power cable between the groove or another roller at the periphery of the half-wheel and the further roller or rollers. Thereby, a secure support of the power cable by the cable support system may be provided.

The guiding system contact portions of the cable support system may comprise elements with which the cable support system is enabled to be guided along the guiding system. The guiding system contact portions may for example engage in respective portions, in particular rails, of the guiding system. When at least two or four guiding system contact portions are provided, the cable support system may securely be guided at the guiding system, in particular parallel to rails of the guiding system.

According to an embodiment of the present invention, the cable contact surface has a curved shape, in particular comprising a half circle, wherein the cable contact surface is configured such that the cable is selectively movable along the cable contact surface if unlocked and locked relative the cable contact surface.

The cable contact surfaces may be a continuous surface or may comprise different separated surface or contact surface areas. The different contact surface areas may for example be arranged in a curved shape, in particular in a shape of a half-circle. The radius of the half-circle may not be lower than a minimal radius of the cable, when bent to a maximal degree. The cable may be movable along the cable contact surface for selecting the particular power cable portion, which should be supported by the cable support system. Before the power cable is moved by moving the cable support system relative to the guiding system, the power cable may be unlocked relative to the cable contact surface. For locking one or more locking members, such as clamps, may be provided. When the cable contact surface has a curved shape, a bent power cable may securely be supported by the cable support system.

According to an embodiment of the present invention, the guiding system comprises at least two parallel linear rails, in particular spaced apart in a first direction perpendicular or travers to an intended guiding direction and extending in a second direction or intended guiding direction, at which the guiding system contact portions of the cable support system are allowed to glide and/or move, in particular when unlocked.

When the wind turbine tower is installed at the final installation site, the linear rails may be oriented substantially in a vertical direction. Thus, the second direction or intended guiding direction may in an installed wind turbine tower, substantially in the vertical direction. In the two rails the at least two or four guiding system contact portions of the cable contact surface may be guided. In other embodiments the guiding system may comprise more than two rails, such as four rails, three rails or even more rails.

The linear rails may for example be connected by one or more bars or beams connecting the linear rails at different longitudinal positions of the linear rails. The linear rails may define a guiding system plane which may in particular or substantially be parallel to a plane of the half-circle or half wheel which may be provided by the cable support system. The plane defined by the two parallel linear rails may be oriented substantially perpendicular to a longitudinal axis of the wind turbine tower. When these two parallel linear rails are provided, the cable support system may securely and accurately be guided, in particular in a vertical direction upwards and downwards depending on the intended power cable handling action.

According to an embodiment of the present invention, the rails have a C-shaped rail profile, the guiding system contact portions of the cable support system comprising at least four wheels/rollers/gliders, in particular spaced apart traverse to the intended guiding direction at a distance corresponding to the distance of the parallel rails, which are partly engageable within the rail profiles, allowing the wheel/roller/glider to roll or glide within the rail profile.

The C-shaped rail profile may allow to partly engage a roller which may be provided at the guiding system contact portions of the cable support system. For example, rollers of the guiding system contact portions of the cable support system may roll within the C-shaped rail profile during movement of the cable support system relative to the guiding system. The rollers or wheels of the guiding system contact portions of the cable support system may thereby be prohibited from leaving the rails or coming off from the rails. Thereby, the cable support system may not unintentionally be separated from the guiding system. Furthermore, the at least four wheels and/or rollers and/or gliders may allow a smooth gliding or movement or rolling of the cable support system relative to the guiding system, wherein friction may be reduced.

According to an embodiment of the present invention, the arrangement further comprises a hoist at one end connectable to a connection location at the guiding system, on another end connectable to at least two holding locations (e.g. two lifting points) at the support system, the hoist being configured to selectively lift or lower the cable support system relative to the guiding system.

The connection location at the guiding system may for example be arranged at a bar connecting the two rails, in particular in the center between the two rails. In other embodiments of the present invention, the connection location comprises two or more connection points of the guiding system. The at least two holding locations at the support system may allow to draw the cable support system together with the power cable in a direction substantially parallel to the direction of the two rails of the guiding system. Thereby, an accurate movement of the cable support system relative to the guiding system may be enabled using the hoist.

According to an embodiment of the present invention, the arrangement further comprises a motor for operating the hoist. The motor may for example be motor of an electrically operated screwdriver. In other embodiments another motor may be utilized. Thereby, the movement of the cable support system relative to the guiding system may be driven by an electric motor, thereby not requiring operation by human personnel.

According to an embodiment of the present invention, the arrangement further comprises a platform floor (e.g. LV-pf), connectable or connected to the tower, wherein the guiding system is fixedly connected to the platform floor, in particular traversing the platform floor, such that a first portion of the guiding system is arranged above the platform floor and a second portion of the guiding system is arranged below the platform floor, in particular further comprising support brackets with clamps below the platform floor.

When the guiding system is connected to the platform floor, installation personnel or maintenance personnel or in general handling personnel can conveniently access the guiding system as well as the support system for supervising the operation and also handling manually the cable and/or brackets and/or locking members, as required depending on the handling action. The platform floor may be a floor of a low-voltage platform (LV-pf) which may be arranged for example as the lowest platform of the wind turbine tower. The guiding system may traverse the platform floor through an opening as explained below.

When a first portion of the guiding system is arranged above the platform floor and a second portion of the guiding system is arranged below the platform floor, the cable support system may for example also be moved such that selectively at least a portion of the cable support system is above the platform floor and a portion of the cable support system is below the platform floor. When the cable support system is moved such that an entirety or at least a portion of the cable support system is above the platform floor, human personnel may easily access the cable support system for properly arranging the power cable at the cable support system and/or activating or deactivating locking elements, such as brackets, as required.

According to an embodiment of the present invention, the platform floor comprises a, in particular closable, through opening in the platform floor allowing the cable support system to be moved through the opening, the support system being guidable through the opening such that: in a normal operational state, in particular after installation and connection to switch gear, the cable support system does not protrude from the platform floor surface upwards, but is arranged entirely below the platform floor, such that in particular an end of the power cable is protruding beyond a lower end of the wind turbine tower and/or in a transport operational state, the support system entirely or at least partly protrudes from the platform floor surface upwards, such that in particular an end of the power cable is not protruding beyond a lower end of the wind turbine tower.

Thereby, a normal operational state as well as a transport operational state may be supported. During the normal operational state (when the wind turbine is in operation and is producing electric energy and carrying the electric energy by the electric power cable to a sea ground buried sea cable) the cable support system does not occupy any space above the platform floor such that it does not interfere with any actions by for example human personnel. Further, in the transport operational state in which the wind turbine tower together with the power cable may be transported to a final installation site, the power cable does not protrude beyond a lower end of the wind turbine tower, such that damage of the power cable is avoided and a secure storage is enabled.

According to an embodiment of the present invention, the arrangement further comprises at least one locking element, in particular bracket or clamp, installed to allow the cable to be locked relative to the support structure and/or guiding system and/or platform; at least one wheel and/or roller and/or glider arranged at the support system and/or the guiding system, wherein in particular the cable support system is movable along a length between 1 m to 5 m.

The locking element may for example be configured as a bracket or any other kind of locking element. The wheel and/or roller and/or glider may be provided to reduce friction when the cable support system is guided along the guiding system and/or when the power cable is guided along the cable support system for properly locating the portion of the cable at the cable support system.

According to an embodiment of the present invention it is provided a wind turbine, comprising a wind turbine tower;

a power cable; and an arrangement according to one of the preceding embodiments. The wind turbine may for example be an offshore wind turbine.

It should be understood that the features, individually or in any combination, explained, provided or applied to an arrangement for handling a power cable of a wind turbine, may also, individually or in any combination, be provided or applied to a method of handling a power cable of a wind turbine according to an embodiment of the present invention and vice versa.

According to an embodiment of the present invention, it is provided a method of handling a power cable (e.g. a portion thereof) of a (e.g. offshore) wind turbine, in particular for transportation and/or connecting to a switch gear and/or reconnecting, the method comprising supporting/holding a portion of the power cable by a cable support system; lifting or lowering the portion of the power cable by guiding the cable support system together with the supported cable along a linear (vertical) track by a guiding system fixedly connected to a wind turbine tower.

In embodiments, the method may be performed for preparing the wind turbine tower together with the power cable for transportation, for example from a pre-assembly site to a final operation site of the wind turbine. Further, in embodiments the method may be performed for allowing connecting the power cable to a switch gear and may be arranged or located within a foundation of the wind turbine, in particular sea foundation.

According to an embodiment of the present invention, the method further comprises after having lifted the portion of the cable: locking the cable to the support system and/or the guiding system; transporting the wind turbine to an offshore installation site. Thereby secure transportation may be enabled.

According to an embodiment of the present invention, the method further comprises after having lowered the portion of the cable, connecting an end of the lowered portion of the cable to a switch gear, wherein in the normal operational state the cable connects a generator system located in a nacelle on top of the tower to a switch gear arranged in a sea bed foundation to which the lower end of the tower is mounted. Thereby, a procedure for connecting the power cable to a sea ground buried cable may be simplified.

According to an embodiment of the present invention, the portion of the cable supported by the support structure defines a plane, wherein an angle enclosed between a normal of the plane and the longitudinal direction of the tower is between 70° and 110°. The plane may for example be the plane defined by a half wheel being one embodiment of the support structure. Thereby, secure movement of the power cable by the cable support system along a vertical direction may be enabled.

BRIEF DESCRIPTION

Figure 2:
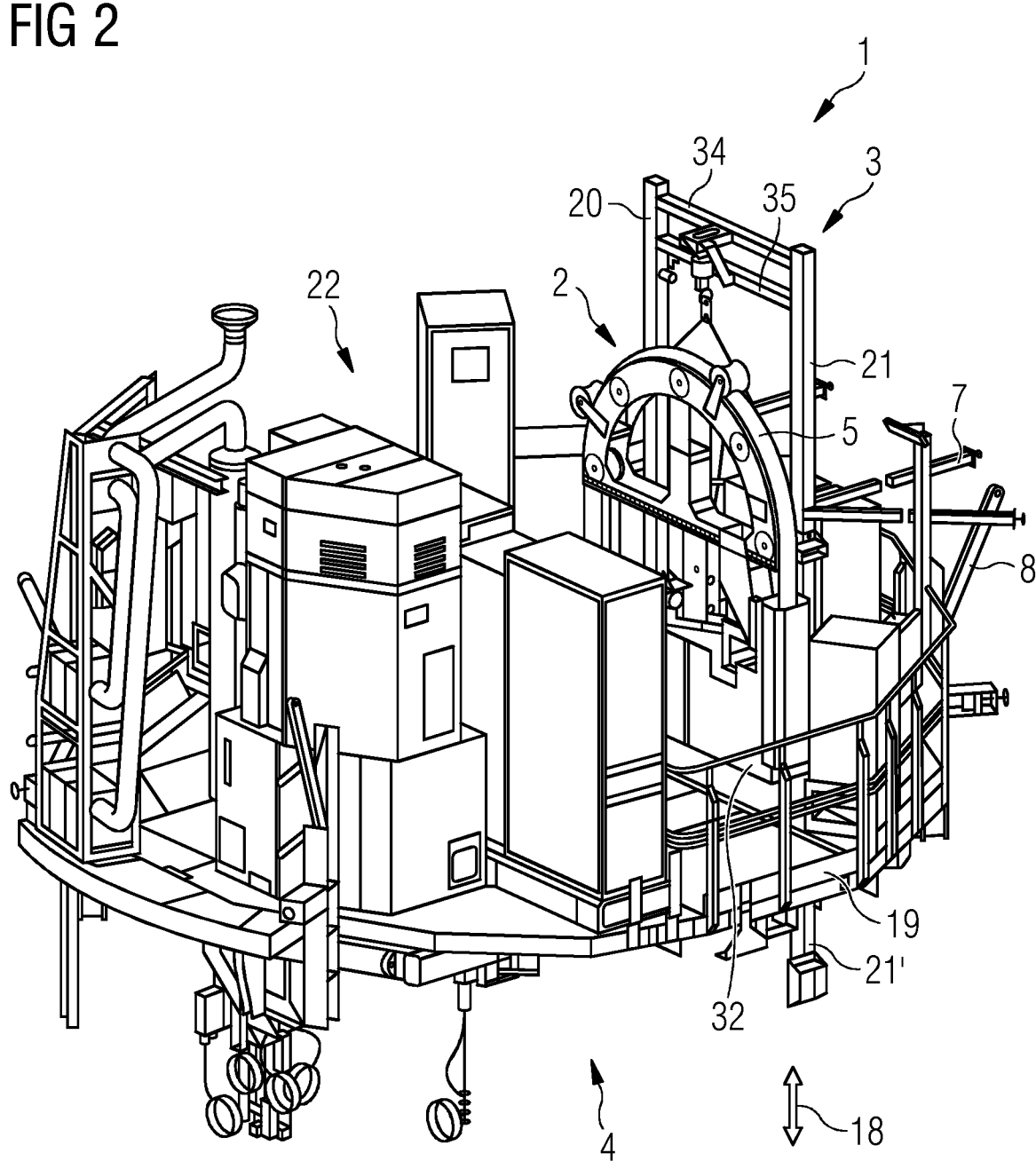
Figure 3:
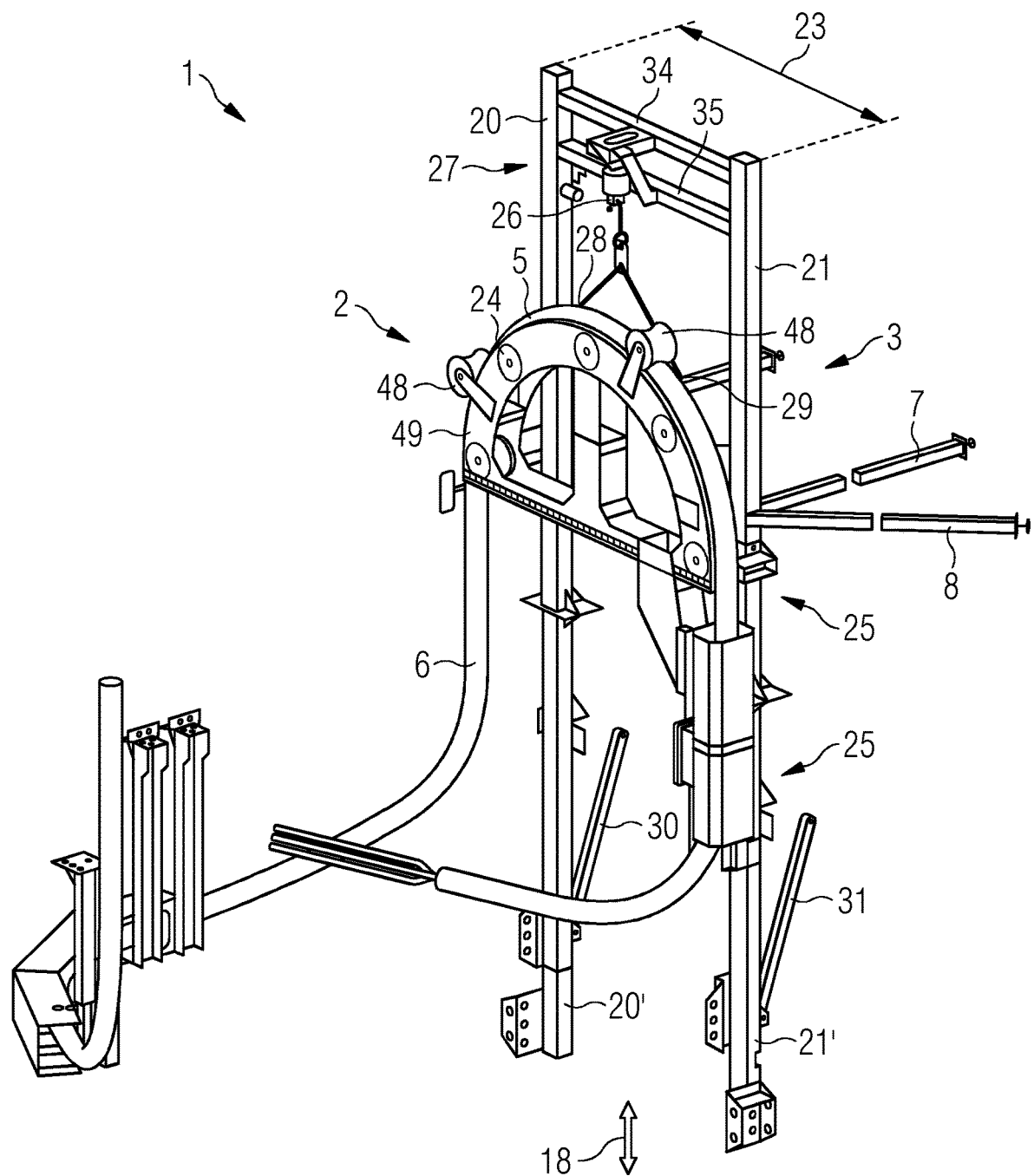
Figure 4:
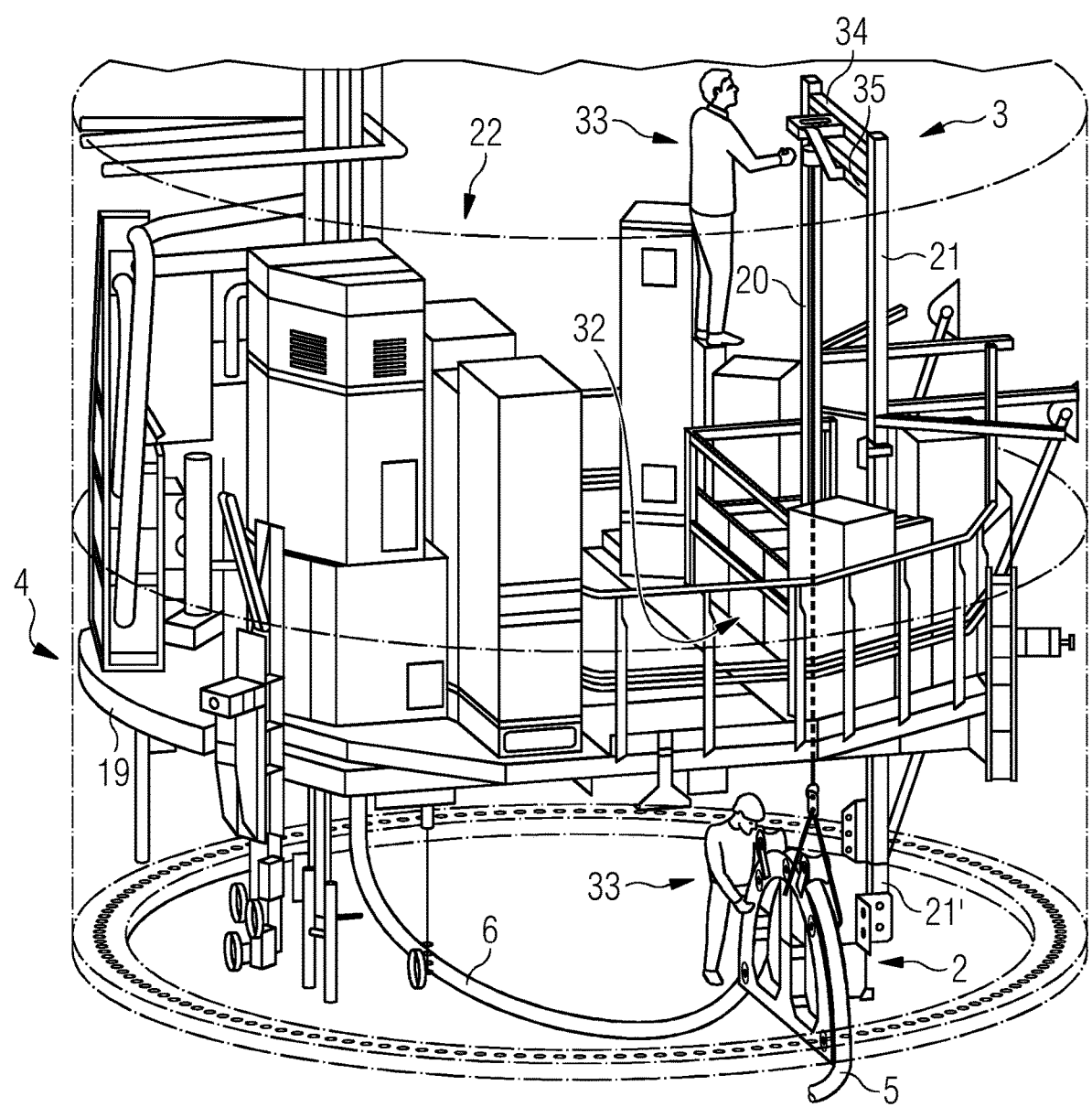
Figure 5:
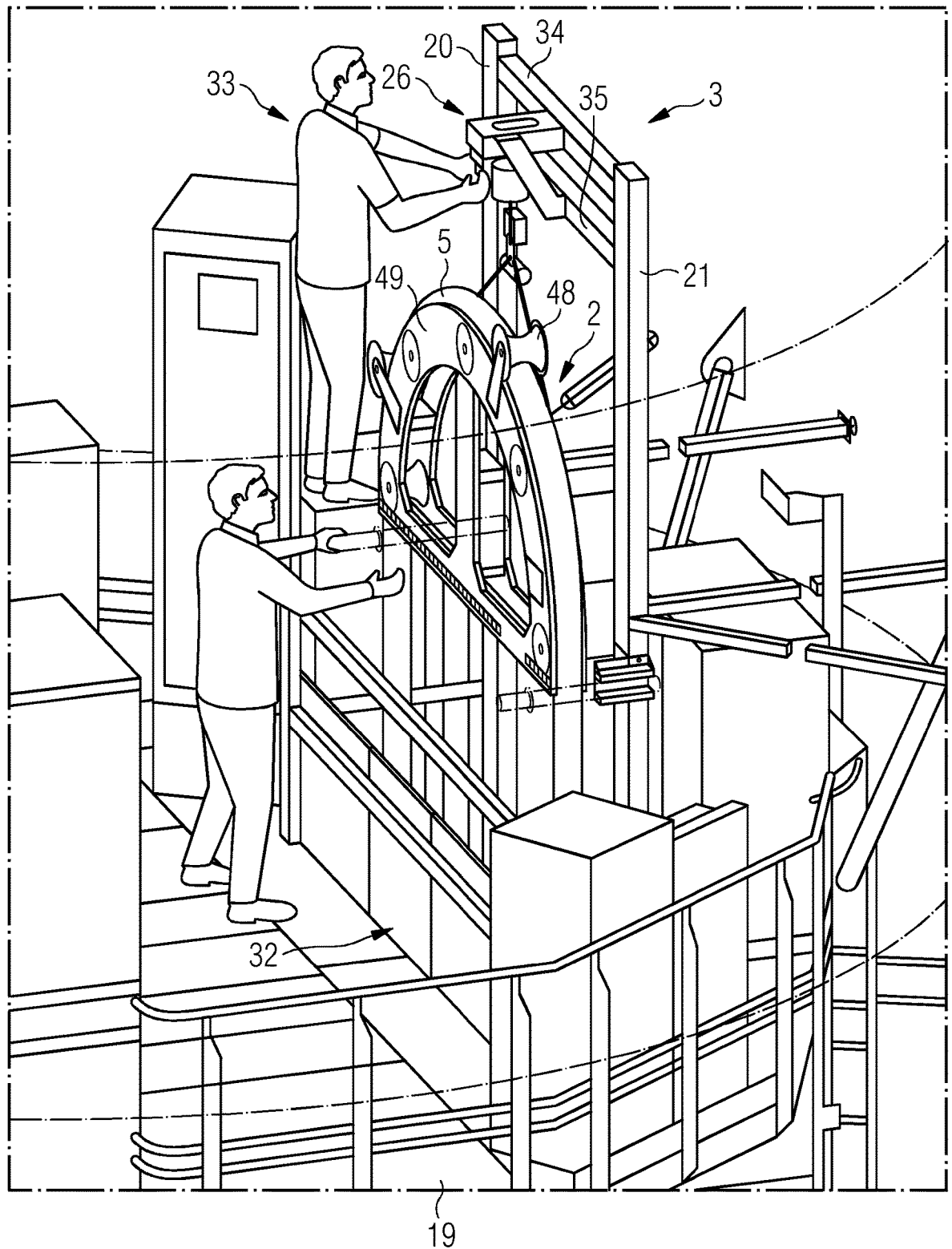
Figure 6:
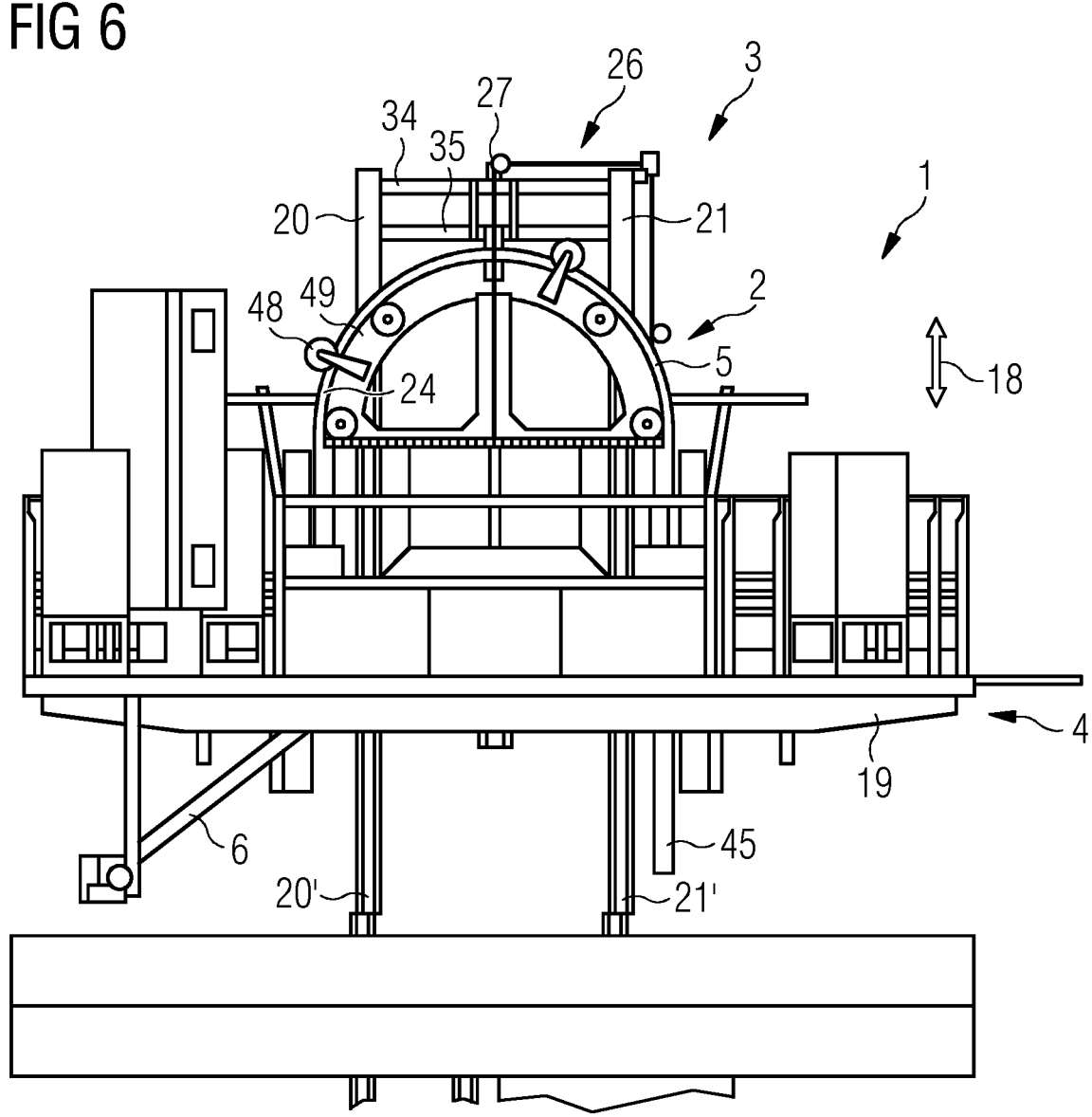
Figure 7:
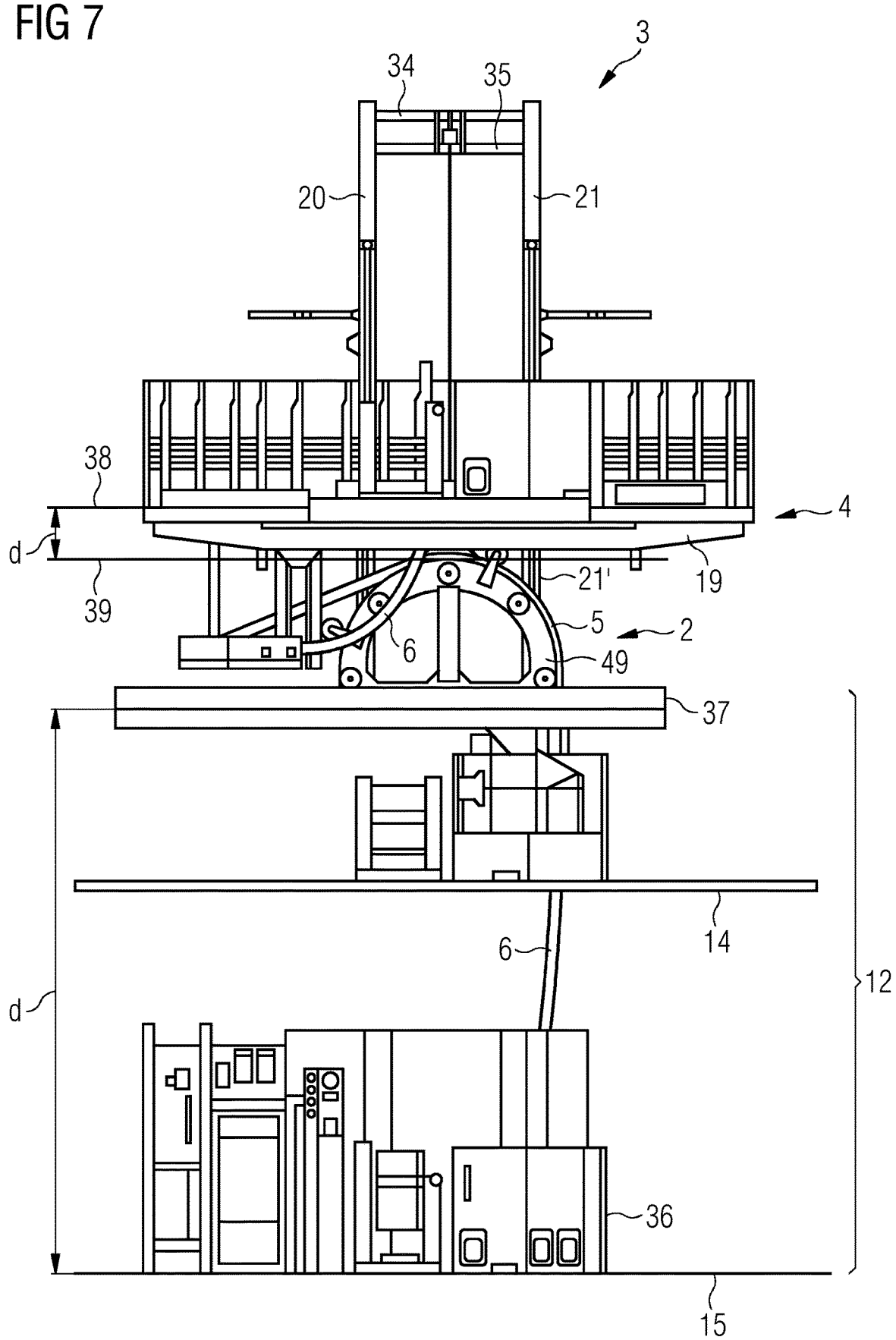
Figure 8:
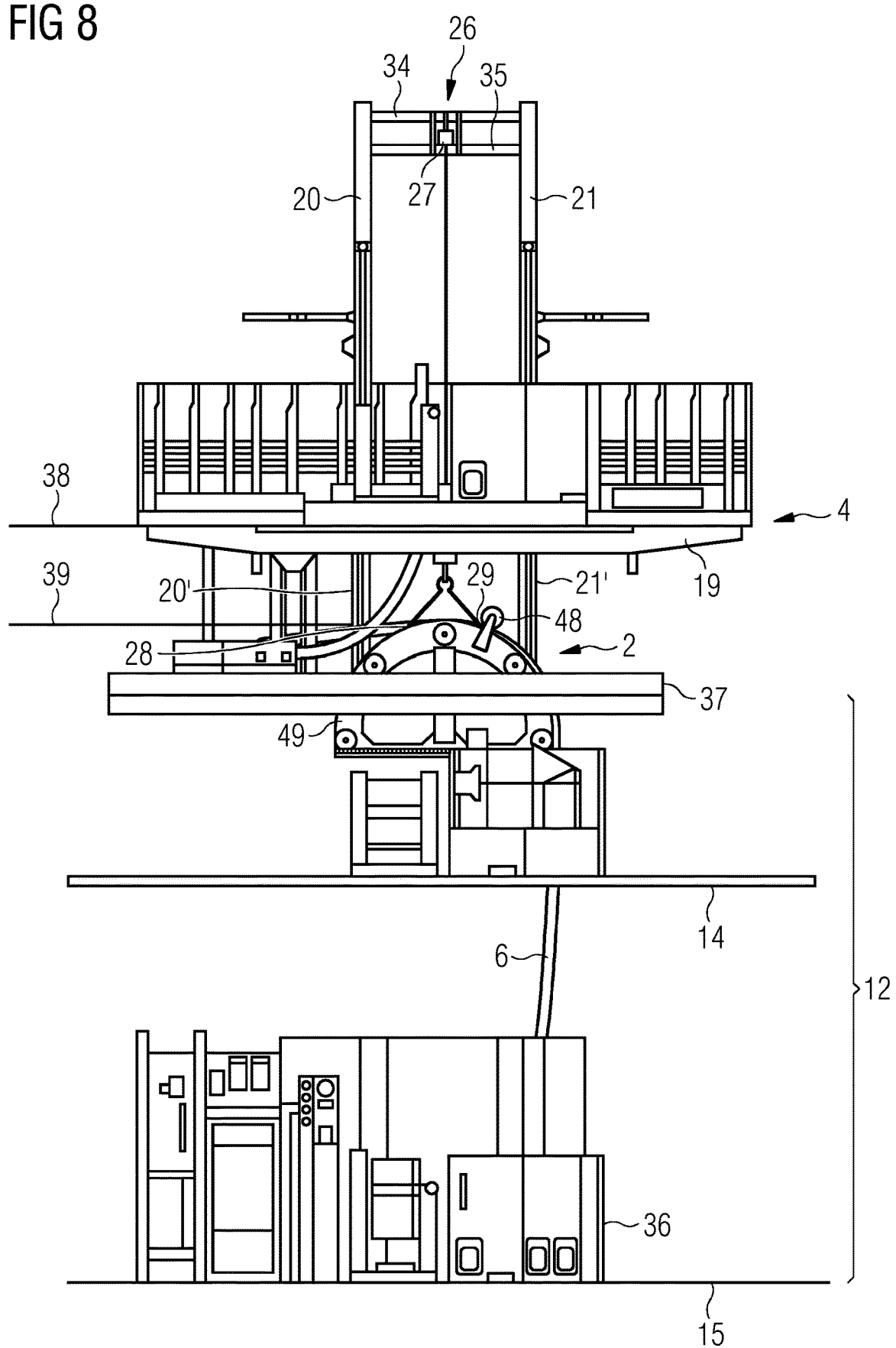
Figure 9:
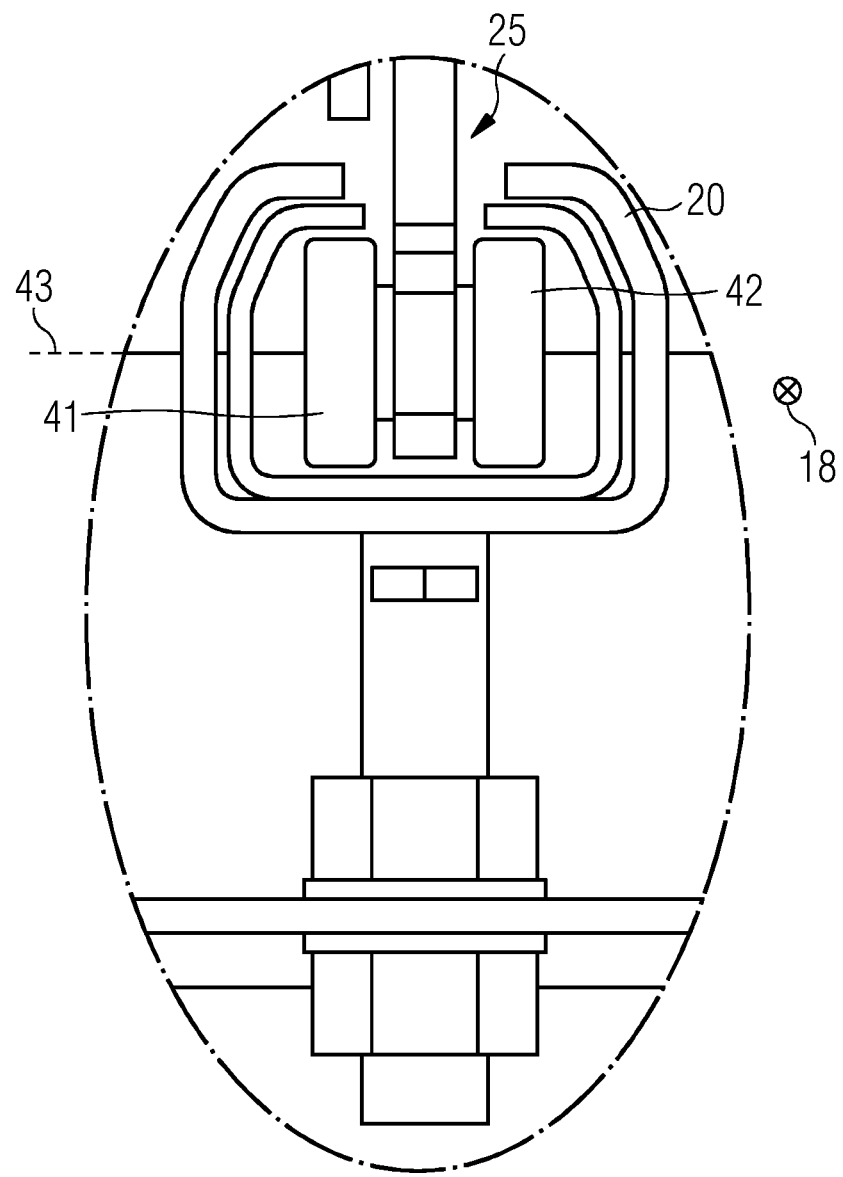

Some of the embodiments will be described in detail, with references to the following Figures, wherein like designations denote like members, wherein:

FIG. 1 schematically illustrates a longitudinal cross-sectional view of a portion of a wind turbine according to an embodiment of the present invention;

FIG. 2 illustrates in a schematic perspective view a portion of an arrangement for handling a power cable including a platform according to an embodiment of the present invention;

FIG. 3 schematically illustrates in a perspective view an arrangement for handling a power cable according to an embodiment of the present invention;

FIG. 4 schematically illustrates a handling step of a method for handling a power cable according to an embodiment of the present invention;

FIG. 5 schematically illustrates another handling step of a method for handling a power cable according to an embodiment of the present invention;

FIG. 6 schematically illustrates a portion of an arrangement for handling a power cable during a transportation operation according to an embodiment of the present invention;

FIG. 7 schematically illustrates a portion of an arrangement for handling a power cable during a normal operational state according to an embodiment of the present invention;

FIG. 8 schematically illustrates a portion of an arrangement for handling a power cable for a different wind turbine configuration during a normal operational state; and FIG. 9 schematically illustrates a sectional view of a rail guiding system together with a roller of a guiding system contact portion of a cable support system according to an embodiment of the present invention.

DETAILED DESCRIPTION

FIG. 1 illustrates in a schematic longitudinal cross-section a wind turbine 10 according to an embodiment of the present invention. The wind turbine 10 comprises a wind turbine tower 11 which is mounted on a foundation 12 which may for example be arranged at a sea ground. In the illustrated embodiment, the wind turbine 10 comprises a low-voltage platform 4 (and possible further platforms) which is fixedly connected or mounted to the wind turbine tower wall 13. The foundation 12 comprises a bolt platform 14, a switch gear platform 15, an airtight platform 16 and a mono-pile or tri-pile (TP) 17.

According to the illustrated embodiment, the low-voltage platform 4 is included in an arrangement 1 for handling a power cable according to an embodiment of the present invention.

FIG. 2 illustrates in a perspective schematic view an arrangement 1 for handling a power cable according to an embodiment of the present invention. Arrangement 1 comprises a power cable support system 2 for supporting or holding a portion 5 of a power cable 6. The arrangement 1 further comprises a guiding system 3 being fixedly connected to a wind turbine tower (via bars or beams 7, 8) and being adapted to guide the cable support system 2 along a linear, in particular vertical, track indicated with double-arrow 18.

The arrangement 1 illustrated in FIG. 2 comprises the platform floor 19 of the low-voltage platform 4, wherein the platform floor 19 is connected to the tower, in particular to the tower wall 13 illustrated in FIG. 1. The guiding system 3 is fixedly connected to the platform floor 19 (as well as to the tower wall 13 via the beams or bars 7, 8). The guiding system comprises at least two parallel linear rails 20, 21. Not in particular illustrated guiding system contact portions of the cable support system 2 allow the cable support system 2 to glide or move along the two parallel linear rails 20, 21. The guiding direction of the cable support system 2 is in the vertical direction 18 illustrated in FIG. 2, i.e. in a direction which is substantially perpendicular to the platform floor 19 and which runs substantially along the longitudinal direction of the wind turbine tower 11.

The vertical rails comprise respective first portions 20, 21, which are arranged above the platform floor 19 and respective second portions 20', 21' which are arranged below the platform floor 19. On the platform floor 19 further equipment collectively labelled with reference sign 22 is arranged, as required by the particular application.

In FIG. 3, the arrangement 1 for handling a power cable is illustrated without the platform 4. The two rails 20, 20', 21, 21' are spaced apart in a first direction 23, which is perpendicular or traverse to an intended guiding direction 18 and they extend in the intended guiding direction or second direction 18. Not in detail illustrated guiding system contact portions of the cable support system 2 are allowed to move along the two parallel linear rails 20, 20', 21, 21'.

The portion 5 of the power cable 6 is arranged at a cable contact surface 24 obscured in FIG. 3 by the cable portion 5 and is hold by outer rollers 48. The cable support system 2 further comprises at least four guiding system contact portions 25 for contacting the guiding system 3. The cable support system is provided with four set of rollers/gliders on the back side that can engage into the rails to constrain the motion of the cable support system to only vertical movement when in installed condition. The profile of the rail prevents the rollers from coming out and restricts them to roll up and down depending on the direction of the operation of the motor. Further, there are stoppers provided on both top and bottom of the rails to prevent the cable support system to come out from the rails.

The cable support system 2 is configured as a half wheel 49.

In the embodiment as illustrated in FIG. 3, the cable support system is configured as a structure of a curved shape, wherein in particular the cable contact surface 24 has a curved shape, is in particular shaped as a half-circle. Thus, the cable support system may include essentially a half wheel or half-annulus. At an outer periphery of the annulus, the cable portion 5 is arrangeable. The cable 6 may be movable along the cable contact surface 24 unlocked or may be locked to the cable contact surface, as required.

The arrangement 1 further comprises a hoist 26 which is at one end connectable to a connection location 27 at the guiding system 3 and on another end connectable to at least two holding locations 28, 29 at the support system 2. The hoist 26 is thereby configured to selectively lift or lower the cable support system 2 relative to the guiding system 3. The hoist 26 may for example be operated by a motor, for example by a screwdriver motor.

In the embodiments illustrated in FIGS. 2, 3 the cable support system provides a half-circle for supporting the power cable 6. According to an embodiment of the present invention, the cable support system is essentially configured as a half wheel support structure. The half wheel support structure may be mounted on the low-voltage platform 4 in the bottom of the tower 11. The arrangement 1 comprises two vertical members 20, 20', 21, 21' and some other support members, such as beams and bars 7, 8, or 30, 31 which allow the guiding system 3 to be mounted directly or indirectly to a wind turbine tower wall 13. The vertical rails 20, 20', 21, 21' may be fixed to the vertical members which may restrict the motion of the half wheel (embodiment of a cable support system 2). The half wheel comprises a metallic structure with rollers to permit smooth movement of the cable when installed in it. Four gliders provided on the half wheel ensure smooth rolling of the half wheel in the rails 20, 20', 21, 21'. On one side of the half wheel, a ladder and clamp arrangement are provided to hold the power cable 6. The two support brackets with clamps under the platform 4 may hold the cable at times when required.

The hoist 26 may be configured as a chain hoist and may be used to operate the half wheel (or in general the cable support system 2) and pull the power cable. The chain hoist 26 is hung from the beam in the center of the half wheel structure.

As can be appreciated from for example FIG. 2, the platform 4 is provided with a through-opening 32 in the platform floor 19 allowing the cable support system 2 to be moved through the opening 32.

FIG. 4 illustrates a method step of handling a power cable 6 according to an embodiment of the present invention. Therein it can be appreciated that the cable support structure 2 has been moved through the through-opening 32 of the platform floor 19 such that the support system 2 does not protrude from the platform floor surface of the floor 19 upwards but is arranged entirely below the platform floor 19. The service personnel 33 is thereby arranging the power cable 6 or a portion thereof around the half wheel, for example for preparing transportation of the wind turbine tower.

FIG. 5 illustrates another method step according to an embodiment of the present invention, wherein the cable support system 2 has been lifted to be entirely or at least partly above the platform floor and that in particular the support system 2 entirely or at least partly protrudes from the platform floor 19 upwards. The configuration as illustrated in FIG. 5 may for example be adopted for a transportation step.

FIG. 6 illustrates an arrangement 1 for handling a power cable according to an embodiment of the present invention in a view along a horizontal direction being perpendicular to the intended guiding direction 18 which may in particular be the vertical direction. The guiding system 3 is mounted to the platform 4 and also optionally to the wind turbine tower wall 13. The two rails 20, 20', 21, 21' are connected with each other at a top portion to (horizontal) bars or beams 34, 35, wherein the bars 34, 35 are oriented to be perpendicular to the longitudinal direction of the rails 20, 20', 21, 21'. The connection location 27 is located or arranged in the center of the beam 34 between the two rails 20, 21. The hoist 26 is arranged at the connection location 27. As can be appreciated from FIG. 6, the first portions 20, 21 of the two parallel rails protrude upwards from the platform floor 19 of the platform 4 and the second portions 20', 21' protrude below the platform floor 19.

FIG. 7 illustrates another method step according to a method according to an embodiment of the present invention. Thereby, the cable support system 2 has been lowered through the platform floor 19 of the platform 4 to be entirely below the platform floor 19. The switch gear unit 36 is located on the switch gear platform 15 (in the foundation) and the end of the power cable 6 has been connected to the switch gear unit 36. Thereby, the power cable traverses the bolt platform 14. The distance d between the switch gear platform 15 and another platform or plane 37 (being the line of interface between the tower bottom flange and the foundation top flange) is for example between 5 m and 8 m. The distance d' between the planes 38, 39 is for example around a half meter. Plane 38 is the top surface of the LV platform and 39 is the top most point on the half wheel. 500 mm is the minimum distance between the platform floor and the top of half wheel. In embodiments, the method step illustrated in FIG. 7 may for example be performed offshore for connecting the power cable to a sea ground buried cable accessible at the switch gear unit 36.

FIG. 8 illustrates a method step of a method for handling a power cable, according to an embodiment of the present invention for reconnecting the power cable. Herein, the cable support structure 2 is lowered by around 1 m, being the difference between the planes 38, 39. This is different from the lowering distance of about 0.5 m as was applied in the method step 7. Thereby, a reconnection of the power cable is enabled.

FIG. 9 illustrates a cross-sectional view of a rail 20 seen along the intended guiding direction 18 in particular being the vertical direction. The rail 20 is characterized by a C-shaped rail profile in cross-section. A guiding system contact portion 25 of the cable support system 2 comprises two parallel wheels 41, 42 which are rotatable around a wheel rotation axis 43 being perpendicular to the intended guiding direction 18. Thus, the wheels 41, 42 engage within the C-shaped rail profile of the rail 20 to enable secure guiding while friction is reduced.

The two rails 20, 20', 21, 21' are provided for a stable movement of the half wheel 2. Thereby, for example four gliders on each side may be provided and there may be an adjustment possibility on rails and gliders. There may be provided a dual lifting point (see lifting points 28, 29 illustrated in FIG. 3). The chain hoist may be used for controlled movement of the half wheel. The chain hoist may be operated by a battery-operated screwdriver. Alternatively, the hoist may be operated manually by a chain loop, as is illustrated in FIG. 6. Embodiments of the present invention may enable to lift the power cable by movement along the guiding system using the cable support system to be between 1 m and 5 m, for example.

In the illustrated embodiments, the platform 4 is provided with a through-opening 32 with hinged hatch plates that may be used to pull up the half wheel 2 along with the power cable 6. A railing may be built around the opening for safe access. During handing the power cable, the cable may be routed through the half wheel on the ground level and then the half wheel may be attached to the rail system 3 to align it with the pulling direction. A hoist may be operated to pull up the half wheel along with the cable to store it above the low-voltage platform 4. There may be stopper and transport brackets to lock the half wheel at transport position. Extra length of the power cable may be hanging below the low-voltage platform up to the bottom flange position of the wind turbine tower and any extra length can be rolled up and fixated under the platform sing some fixation means.

The wind turbine tower may then be transported in the condition as is for example illustrated in FIG. 6 to the offshore installation site. The main hoist may be re-installed and transport lock may be released to allow the half wheel to be lowered below the low-voltage platform and connect the power cable into the switch gear located in the transition piece or the foundation 12. There may be another locking position under the low-voltage platform to hold the half wheel in its condition. Further, the half wheel may be fixed to the vertical beams using bolted connection.

Embodiments of the present invention may provide one or more of the following benefits. The cable installation may be very easy with chain hoist and no handling may be necessary. The half wheel handling may be smooth due to the two both side support. Least effort may be used for service if needed in future for re-connection. Additional tools or parts may be needed. While the installation or the working tools and parts are having easy accessibility. Good visibility may be provided while during these activities. Steps to connect the power cable in the switch gear unit may be very less compared to previous solution, thereby reducing installation time at offshore. The handling of the half wheel with the high-voltage cable using a chain hoist with two rail system two-point connection on half wheel may reduce the manual work.

Although the present invention has been disclosed in the form of embodiments and variations thereon, it will be understood that numerous modifications and variations could be made thereto without departing from the scope of the invention.

For the same of clarity, it is to be understood that the use of "a" or "an" throughout this application does not exclude a plurality, and "comprising" does not exclude other steps or elements.

The invention claimed is:

1. An arrangement for handling a power cable of a wind turbine, the arrangement comprising:
   a cable support system configured to support a portion of the power cable;
   a guiding system being fixedly connectable or connected to a wind turbine tower and being configured to guide the cable support system along a linear track; and
   a platform floor, connectable or connected to the wind turbine tower;
   wherein the guiding system is fixedly connected to the platform floor, traversing the platform floor, such that a first portion of the guiding system is arranged above the platform floor and a second portion of the guiding system is arranged below the platform floor; and
   wherein the platform floor comprises a closable through opening in the platform floor configured to allow the cable support system to be moved through the opening, the cable support system being guidable through the opening such that:
      in a normal operational state, after installation and connection to a switch gear, the cable support system does not protrude from the platform floor surface upwards, but is arranged entirely below the platform floor, such that an end of the power cable protrudes beyond a lower end of the wind turbine tower, and/or
      in a transport operational state, the cable support system entirely or at least partly protrudes from the platform floor surface upwards, such that an end of the power cable does not protrude beyond the lower end of the wind turbine tower.

2. The arrangement according to claim 1, wherein the cable support system comprises:
   a cable contact surface for contacting/supporting the portion of the cable; and
   at least two guiding system contact portions for contacting to the guiding system.

3. The arrangement according to claim 2, wherein the cable contact surface has a curved shape, including a half circle,
   wherein the cable contact surface is configured such that the cable is selectively:
      movable along the cable contact surface if unlocked; and
      locked relative the cable contact surface.

4. The arrangement according to claim 1, wherein the guiding system comprises at least two parallel linear rails, spaced apart in a first direction perpendicular or traverse to an intended guiding direction and extending in a second direction or intended guiding direction, at which the guiding system contact portions of the cable support system are allowed to glide/move when unlocked.

5. The arrangement according to the claim 4, wherein the rails have a C-shaped rail profile, the guiding system contact portions of the cable support system comprising at least four wheels, spaced apart traverse to the intended guiding direction at a distance corresponding to the distance of the parallel rails, which are partly engageable within the rail profiles, allowing the wheel to roll within the rail profile.

6. The arrangement according to claim 1, further comprising:
a hoist at one end connectable to a connection location at the guiding system, on another end connectable to at least two holding locations at the support system, the hoist being configured to selectively lift or lower the cable support system relative to the guiding system.

7. The arrangement according to claim 6, further comprising a motor for operating the hoist.

8. The arrangement according to claim 1, further comprising:
support brackets with clamps below the platform floor.

9. The arrangement according to claim 1, further comprising at least one of:
at least one locking element, bracket or clamp, installed to allow the cable to be locked relative to the support structure and/or guiding system and/or platform;
at least one wheel and/or roller and/or glider arranged at the support system and/or the guiding system,
wherein the cable support system is movable along a length between 1 m to 5 m.

10. A wind turbine, comprising:
a wind turbine tower;
a power cable; and
the arrangement according to claim 1.

11. The arrangement according to claim 1, wherein the arrangement is for transportation and/or connecting to a switch gear.

12. The arrangement according to claim 1, wherein the linear track is vertical.

13. The arrangement according to claim 1, wherein the wind turbine is an offshore wind turbine.

14. A method of handling a power cable of a wind turbine, for transportation and/or connecting to a switch gear and/or reconnecting, the method comprising:
supporting a portion of the power cable by a cable support system configured to be guided along a linear track by a guiding system fixedly connected to a platform floor and traversing the platform floor such that a first portion of the guiding system is arranged above the platform floor and a second portion of the guiding system is arranged below the platform floor, wherein the platform floor comprises a closable through opening configured to allow the cable support system to be moved through the opening; and
lifting and/or lowering the portion of the power cable by guiding the cable support system together with the supported cable,
wherein in a normal operational state, after installation and connection to a switch gear, the cable support system does not protrude from the platform floor surface upwards, but is arranged entirely below the platform floor, such that an end of the power cable protrudes beyond a lower end of the wind turbine tower, and/or
wherein in a transport operational state, the cable support system entirely or at least partly protrudes from the platform floor surface upwards, such that an end of the power cable does not protrude beyond the lower end of the wind turbine tower.

15. The method according to claim 14, further comprising after having lifted the portion of the cable:
locking the cable to the support system and/or the guiding system;
transporting the wind turbine to an offshore installation site.

16. The method according to claim 14, further comprising after having lowered the portion of the cable:
connecting an end of the lowered portion of the cable to a switch gear, wherein in the normal operational state the cable connects a generator system located in a nacelle on top of the tower to the switch gear arranged in a sea bed foundation to which the lower end of the tower is mounted.

17. The method according to claim 14, wherein the portion of the cable supported by the support structure defines a plane, wherein an angle enclosed between a normal of the plane and the longitudinal direction of the tower is between 70° and 110°.

* * * * *